3,309,295
DISTILLATION OF HEAT SENSITIVE
COMPOUNDS
Robert P. Cahn, Millburn, and Frank J. Herrmann, Morris Township, Morris County, N.J., assignors to Esso Research and Engineering Company, a corporation of Delaware
Filed Jan. 12, 1962, Ser. No. 165,756
1 Claim. (Cl. 202—153)

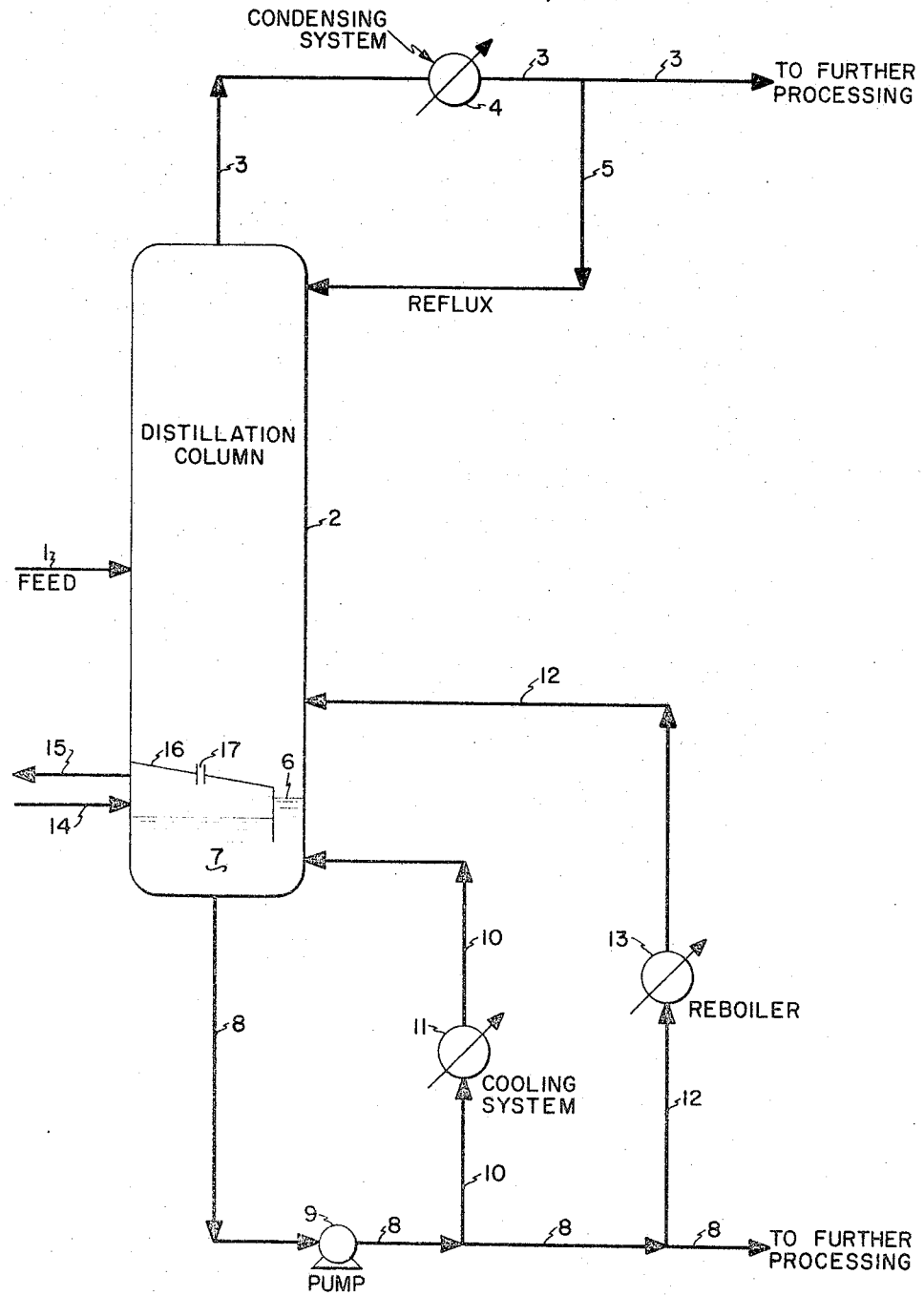

This invention relates to the distillation of heat sensitive materials. More particularly, this invention relates to the continuous distillation of feed materials which contain a material sensitive to heat at the temperature of distillation.

An object of this invention is to permit distillation of heat sensitive materials in conventional distillation equipment without exceeding practical vacuums and without unduly long exposure of the heat sensitive materials to high temperatures. An advantage to be realized from the application of this invention is to be able to carry out such distillations in smaller towers by using higher pressures. Higher pressures may be employed since the time of exposure of the heat sensitive materials to high temperatures is reduced by the present invention. Further advantages will be apparent from the discussion.

Continuous distillation is normally carried out in a distillation or rectification column. The feed material is usually fed into the mid-section of the column and thereafter separates into a vapor phase and a liquid phase. The vapor phase passes out of the upper section of the column at or near the top and a portion of the vapor phase is thereafter condensed in a condensing system and returned to the upper section of the column as reflux. The liquid phase flows down through the distillation column and at least a part of the liquid phase is withdrawn from the bottom of the column. A portion of the withdrawn bottoms product is heated in a reboiler and returned to the distillation column to provide the necessary heat. Alternatively, self-refluxing towers may be employed where the feed is introduced at the top of the tower and no reflux is pumped back to the tower from the overhead stream.

A considerable inventory of liquid bottoms product is normally required in a conventional, continuous distillation system so that operating conditions may be changed while maintaining the necessary liquid phase-vapor phase equilibrium. Operating conditions would normally be changed when the composition or quantity of the feed changes, the desired composition or quantity of the products changes, or when other factors warrant such a change. Additionally, a considerable inventory of liquid product is required to maintain normal control over the system for such things as "start-ups" and "shut-downs" as well as for adequate control of other units within the overall processing operation.

Under normal conditions this inventory of liquid product is maintained in two places, viz the reboiler and the bottom of the column. As a consequence, the liquid bottoms product is subjected to prolonged heating at high temperatures. The inventory time during which the liquid bottoms product is subjected to these high temperatures may be in the range of a few minutes to a number of hours. Usually, this exposure to high temperatures is from 0.2 to 0.5 hour.

Because of the prolonged heating in a conventional, continuous distillation process, heat sensitive materials often undergo chemical changes, e.g., decomposition or polymerization. These changes may result in large losses of the desired product or may throw the product off the desired specification and can cause plugging or fouling of the equipment.

There are several known ways for avoiding or reducing such losses. It has been suggested that the distillation be carried out under low pressures, e.g., 5–30 mm. Hg absolute or by adding agents which will stabilize the heat sensitive material. These methods are often impractical and may be unsuccessful. Low pressures are expensive to maintain and sometimes lower the efficiency and the productive capacity of the system. Additionally, the high pressure drop in some plate or packed towers can prevent the establishment of the desired vacuum in the bottom of the column. The use of stabilizing agents may result in an intolerable contamination of the product.

Realizing the limitations of the above methods, various alternate methods have been proposed for the distillation of heat sensitive compounds. One of the methods proposed (U.S. Patent No. 2,664,391 which is incorporated herein by reference) requires the construction of a separate storage vessel in free communication with the bottom of the distillation column and in free communication with the reboiler. In such a system, the relative physical elevations of each of the vessels (distillation column, storage vessel and reboiler) are adjusted so that practically no liquid remains in the bottom of the distillation column and so that the liquid level in the reboiler remains essentially constant. The liquid in the separate vessel is cooled to a temperature below that where appreciable chemical changes occur. This system results in the reduction of the amount of time that the heat sensitive liquid is exposed to high temperatures.

However, such a system as has just been described has numerous drawbacks; the requirement for the construction of a separate vessel, the critical positioning of the elements of the system, violent agitation of the liquid surface in one of the vessels will disrupt the pressure balance in the system; the small amount of liquid product remaining in the bottom of the column is exposed to high temperatures before it is withdrawn, and the system requires the use of a thermosyphon reboiler. This latter drawback is very important since thermosyphon reboilers generally have higher skin temperatures and longer residence times than equivalent forced circulation reboilers.

The present invention relates to a simpler, more efficient system for the distillation of heat sensitive materials. It also allows the more economical use of higher column pressures and temperatures.

The accompanying drawing illustrates the present invention in schematic form.

Referring now to the drawing, feed material containing a heat sensitive compound is fed through line 1 into the midsection of the distillation column 2 which is provided with suitable vapor-liquid contacting devices, such as plates or packing, where it separates into a vapor phase and a liquid phase. The vapor phase passes out of the upper section of the distillation column 2 through line 3 to a condensing system 4. Part of the condensate is withdrawn via line 3 and returned via line 5 to the distillation column 2 as reflux. The remaining condensate is withdrawn via line 3 and is passed on to further processing. A portion of the liquid phase flows down through the column 2, through the downcomer 6 where it is cooled by and becomes a part of the pool of liquid product 7. The pool of liquid product 7 is maintained at a temperature below that where appreciable chemical changes occur.

The liquid product is withdrawn from the pool of liquid product 7 via line 8 and passes through the pump 9, after which it is separated into two streams which pass through lines 8 and 10, respectively.

The liquid product traveling through line 10 is cooled in the cooling system 11 after which it is returned to the pool of liquid product 7. The exact quantity of the material passing through the cooling system will be determined by the amount of cooling required, but will generally be from 10% to 80% of the total withdrawn liquid product.

The remaining liquid product traveling through line 8 is then further divided into two streams. One continues on through line 8 to further processing. The other passes through line 12 to the reboiler 13 where it is heated and then returned to the distillation column 2. The exact amount of material passing through the reboiler will be determined from the heat requirements of the system and the degree of vaporization desired for optimum reboiler design. Generally, it will be from 30% to 90% of the total withdrawn liquid products.

Inert gas may be introduced into the distillation column 2 via line 14 to maintain any desired pressure in the vapor space under baffle 16. Line 15 is an exhaust line for the inert gas.

The plate or baffle 16 provides a physical barrier between the upper portion of the column 2 and the pool of liquid product 7 and thereby isolates most of the cooled liquid from the warmer material above the plate.

A weep hole 17 may be employed to permit pressure equalization. Alternatively, a plurality of small perforations may be employed. The exact size of these holes is not important, but they may be from 1/16 to 1/4 inch in diameter. Because of the increased pressure in the vapor space caused by the introduction of the inert gas, the flow of gas during pressure equalization is from the vapor space upwards into the distillation zone.

The vapor pressure of the liquid in pool 7 is lower than the pressure obtained in the section of the column just above the barrier 16, since the liquid in pool 7 is at a lower temperature than the liquid entering downcomer 6 from above and both liquids have the same composition. This pressure differential could result in undue stress on the barrier 16 and also create considerable instability in the liquid level in downcomer 6. This pressure differential would necessitate extending downcomer 6 so as to balance the pressure by an equivalent hydraulic head. Thus if the pressure differential were 2 inches Hg, the equivalent hydraulic head of an organic liquid of a density of 0.7 to 1.0 can amount to 2.5 to 4 ft. It seems apparent that such an arrangement would call for excessive downcomer length especially when it is realized that normal design specifications require a safety factor of about 2. Consequently it it the purpose of the gas injection through line 14 to equalize the pressures above and below barrier 16 by maintaining the sum of the partial pressure of the inert gas and the vapor pressure of the cool liquid equal to or greater than the vapor pressure of the hot liquid.

Another method of equalizing the pressures above and below barrier 16 is by means of a pressure differential controller monitoring the pressure immediately above and below the barrier 16 which would regulate the flow of inert gas to the vapor space above pool 7 (just below barrier 16). A constant purge of inert gas (plus admixed vapor) from the system via line 15 would insure adequate control. An advantage of this system is that the weep hole, 17, can be eliminated and therefore no inert gas is allowed to enter the distillation zone, thus resulting in smoother operations and a reduced load on the vacuum system.

The following example is provided to illustrate a particular embodiment of the present invention and should not be construed as limiting the invention.

EXAMPLE 1

Nine hundred lb./hr. of trimethylol propane (TMP) and heavy ends together with 100 lbs./hr. of light ends incident to its manufacture are fed at 190° C. into the center of a packed (ceramic rings) distillation column operating at about 215° C. and 50–70 mm. Hg absolute in a process substantially as described hereinbefore with reference to the drawing. The pool of liquid product 7 is maintained at 190° C. About 30% of the liquid product is cooled to 120° C. in cooler 11 before being returned to the pool of liquid product 7. About 50% of the liquid product is heated to 220° C. and partially vaporized in the reboiler 13 and returned to the distillation column 2. The bottoms product of about 900 lbs./hr. of TMP and heavy ends is removed via line 8 and fed to a subsequent purification process. The total residence time of TMP in the column at temperatures above 200° C. is 4 minutes, resulting in negligible product degradation. In a conventional system this residence time would have been about 15 to 20 minutes, most of which would have been at temperatures of 215° to 220° C. at which the breakdown of TMP is quite severe. This is shown in the following table.

Table I.—Thermal decomposition rate of trimethylol propane

| Temperature, °C. | Decomposition rate, percent/hr. |
|---|---|
| 200 | 0.05 |
| 210 | 0.2 |
| 220 | 0.4 |
| 250 | 1.4+ |

An indication of the pressure differential above and below the plate can be gleaned from the following table.

Table II

| Temperature, °C.: | Vapor pressure of TMP, mm. Hg |
|---|---|
| 150 | 3 |
| 190 | 22 |
| 200 | 33 |
| 220 | 75 |
| 250 | 230 |

Thus where the liquid above barrier 16 is at 220° C. and the liquid in pool 7 is at 190° C., the differential vapor pressure is 53 mm. Hg or about 2 inches Hg.

It should be realized that thermal degradation to the extent of 0.1% leads to an unsatisfactory product, since it results in decomposition products which are difficult to separate from the desired end product.

The invention is applicable in many situations and to many feed materials. Examples of other heat sensitive materials within the scope of this invention are other polyhydroxy compounds, isobutyl bromide, vinyl toluene, higher ketones and aldehydes, conjugated diolefins, acetylenes, vinyl compounds in general, and many difunctional compounds which are used as raw materials for the manufacture of plastics.

While this invention has been described with particular reference to certain examples, it should not be construed as being limited thereby. It is to be recognized that the present invention may be modified to fit many different needs, e.g., batch distillation or multiple still distillation.

What is claimed is:

A distillation apparatus comprising a vertical shell, means for withdrawing vaporous materials from the upper section of said shell, a plate supported internally in the lower section of said shell, said plate substantially separating the distillation apparatus into an upper distillation section and a lower reservoir, conduit means for passing liquid materials from said distillation zone to the reservoir, said liquid materials forming a pool in said reservoir and being separated from said plate by means of a vapor space, means for introducing an inert gas into said vapor space, the flow of said inert gas being controlled by a pressure differential controller connected to said upper distillation zone and said vapor space, means for withdrawing liquid materials from said reservoir, means for passing a first portion of said withdrawn liquid materials to a cooling section, means for cooling said first portion of withdrawn liquid material and returning it to said reservoir, means for passing a second portion of said withdrawn liquid material to a heating section, means for heating said second portion of said withdrawn liquid material and returning it to the distillation zone, and means for removing a third portion of said withdrawn liquid materials as a product stream.

References Cited by the Examiner

UNITED STATES PATENTS

| | | | |
|---|---|---|---|
| 2,452,797 | 11/1948 | Smith | 202—70 |
| 2,501,326 | 3/1950 | Gilmore | 202—51 X |
| 2,588,305 | 3/1952 | Sullenger | 208—349 |
| 2,664,391 | 12/1953 | Coulter | 202—40 |
| 2,695,264 | 11/1954 | Taff et al. | 196—131 X |
| 2,795,536 | 6/1957 | Grossberg et al. | 202—70 |
| 2,995,500 | 8/1961 | Dilbert | 202—46 |

NORMAN YUDKOFF, *Primary Examiner.*

W. L. BASCOMB, F. DRUMMOND,

*Assistant Examiners.*